United States Patent
Scozzola

(10) Patent No.: US 11,038,554 B2
(45) Date of Patent: Jun. 15, 2021

(54) DISTRIBUTED MICROCONTROLLER

(71) Applicant: STMicroelectronics (Grenoble 2) SAS, Grenoble (FR)

(72) Inventor: Giovanni Scozzola, Saint Egreve (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 0 days.

(21) Appl. No.: 16/844,816

(22) Filed: Apr. 9, 2020

(65) Prior Publication Data

US 2020/0235785 A1    Jul. 23, 2020

Related U.S. Application Data

(63) Continuation-in-part of application No. 16/530,069, filed on Aug. 2, 2019, now Pat. No. 10,817,461.

(30) Foreign Application Priority Data

Aug. 10, 2018  (FR) ...................................... 1857433

(51) Int. Cl.
| | |
|---|---|
| *H04N 1/00* | (2006.01) |
| *G06F 1/00* | (2006.01) |
| *H04B 1/38* | (2015.01) |
| *G06F 15/78* | (2006.01) |
| *G06F 13/42* | (2006.01) |
| *H04B 5/00* | (2006.01) |
| *H04W 4/80* | (2018.01) |
| *G06F 13/38* | (2006.01) |

(52) U.S. Cl.
CPC ......... *H04B 5/0037* (2013.01); *G06F 13/385* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 7,840,188 B2 | 11/2010 | Kurokawa | |
| 10,027,842 B2* | 7/2018 | Haba ................. | H04M 1/72527 |
| 10,482,660 B2* | 11/2019 | Harvey ............ | H04N 21/44226 |
| 10,742,729 B2* | 8/2020 | Jhanji .................. | H04W 76/14 |
| 10,817,461 B2* | 10/2020 | Scozzola ................. | G06F 13/42 |
| 2006/0211449 A1 | 9/2006 | Haque et al. | |

FOREIGN PATENT DOCUMENTS

WO        2013089736 A1    6/2013

* cited by examiner

*Primary Examiner* — Kenneth B Wells
(74) *Attorney, Agent, or Firm* — Slater Matsil, LLP

(57) ABSTRACT

A microcontroller includes a plurality of electronic functional circuits comprising a read-only memory (ROM) and a central processing unit (CPU) and an interconnection circuit. The CPU and the interconnection circuit are disposed in a mobile electronic device and the ROM is disposed outside the mobile electronic device. The interconnection circuit is configured to communicate with the plurality of electronic functional circuits. The communication with the ROM is wireless communication.

20 Claims, 9 Drawing Sheets

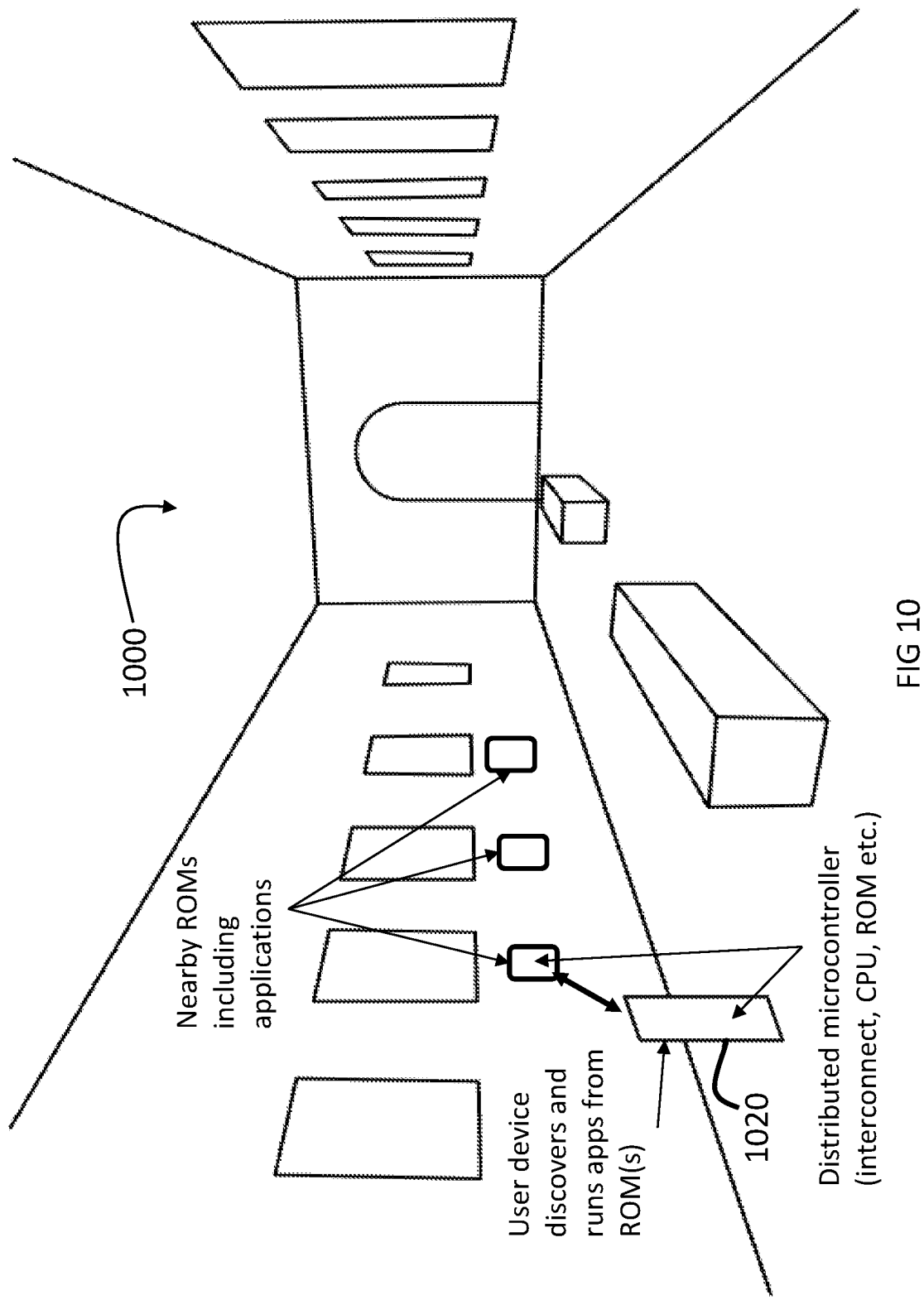

DISTRIBUTED MICROCONTROLLER

CROSS-REFERENCE TO RELATED APPLICATIONS

This is a continuation-in-part application of U.S. application Ser. No. 16/530,069, filed Aug. 2, 2019, now issued as U.S. Pat. No. 10,817,461, which claims priority to French Patent Application No. 1857433, filed on Aug. 10, 2018, which applications are hereby incorporated by reference in their entirety.

TECHNICAL FIELD

The present disclosure concerns microcontrollers and, in particular embodiments, the interconnections of the different functions of a microcontroller.

BACKGROUND

A microcontroller generally is an integrated circuit which gathers the essential electronic functions of a computer, for example: central processing unit or processor, memories (ROM and RAM), and input-output interfaces. The different electronic functions of a microcontroller are generally connected to one another via a bus.

The different interconnects within a microcontroller are formed in wired fashion. Thus, the positioning of the different functions is limited by such interconnects.

Further, the number of functions is limited to the functions integrated on manufacturing of the microcontroller.

SUMMARY

An embodiment overcomes all or part of the disadvantages of usual microcontrollers.

An embodiment provides a microcontroller comprising distinct electronic functions and an interconnection circuit capable of transmitting, in wireless fashion, data between the functions.

According to an embodiment, at least one function comprises a central processing unit and at least one function comprises a memory.

According to an embodiment, the different electronic functions are not interconnected by a wire connection.

According to an embodiment, an electronic function comprises an input/output interface.

According to an embodiment, the input/output interface comprises wire connections with peripherals.

According to an embodiment, the interconnection circuit is a Wi-Fi router.

According to an embodiment, the interconnection circuit comprises a central processing unit, a router, a memory, and a data transmit/receive circuit.

According to an embodiment, a usage mode comprises the steps of: determining the electronic functions which are present; if electronic functions which do not have their configuration characteristics contained in the memory are present, writing their configuration characteristics into the memory of the interconnection circuit; and if electronic functions having their configuration characteristics contained in the memory are absent, erasing their configuration characteristics from the memory of the interconnection circuit.

According to an embodiment, these steps are periodically carried out during the operation of the microcontroller.

According to an embodiment, the period is in the range from approximately 1 ms to approximately 10 s.

According to an embodiment, the usage mode comprises the steps of: determining a program to be executed; determining the electronic functions used by the program; determining whether these electronic functions are available; making these electronic functions inaccessible to other programs; establishing a wireless connection between the electronic functions; and executing the program.

According to an embodiment, each electronic function comprises a data transmit/receive circuit.

According to an embodiment, the interconnection circuit is capable of detecting the addition and/or the removal of electronic functions to and/or from the microcontroller.

According to an embodiment, the interconnection circuit and at least some of the electronic functions are powered in wireless fashion.

According to an embodiment, the interconnection circuit is disposed inside a mobile electronic device.

According to an embodiment, the microcontroller includes a CPU disposed in a mobile electronic device.

According to an embodiment, the microcontroller including the interconnection circuit and the CPU inside the mobile electronic device wirelessly communicates with a ROM disposed outside the mobile electronic device, the ROM also being part of the microcontroller.

According to an embodiment, the microcontroller wirelessly communicates using 5G.

The foregoing and other features and advantages will be discussed in detail in the following non-limiting description of specific embodiments in connection with the accompanying drawings.

BRIEF DESCRIPTION OF THE DRAWINGS

FIG. 10 provides an illustration of an application of the example usage modes of FIGS. 8 and 9.

DETAILED DESCRIPTION OF ILLUSTRATIVE EMBODIMENTS

Figure 1:
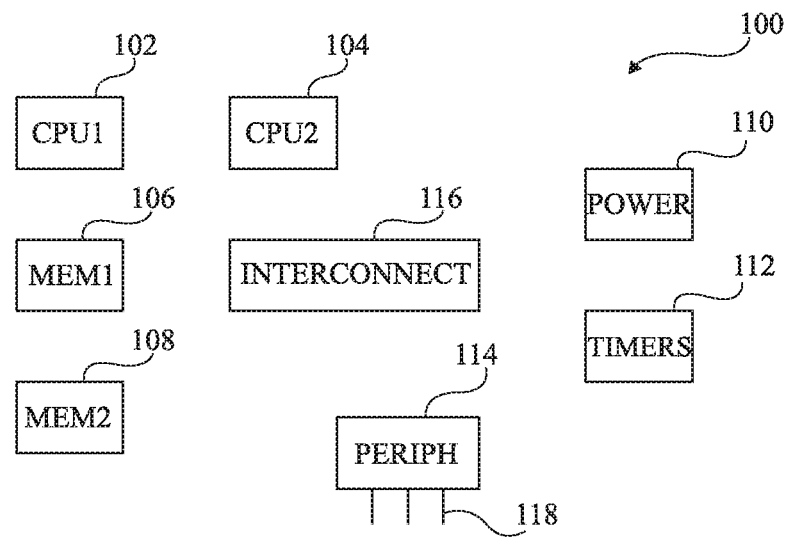
FIG. 1 schematically illustrates an embodiment of a microcontroller.

The same elements have been designated with the same reference numerals in the different drawings. For clarity, only those steps and elements which are useful to the understanding of the described embodiments have been shown and are detailed.

The terms "approximately", "about", "substantially", and "in the order of" are used herein to designate a tolerance of plus or minus 10%, preferably of plus or minus 5%, of the value in question.

Unless otherwise specified, when reference is made to two elements connected together, this means that the elements are directly connected with no intermediate element other than conductors, and when reference is made to two elements coupled together, this means that the two elements may be directly coupled (connected) or coupled via one or a plurality of other elements.

System-on-chip (SOC) devices can include radio circuits in the chip. As such, a connected object can include a microcontroller with capacity to process information and a radio circuit. This combination is able to send sometimes data with a very low power consumption. As disclosed herein, functional circuits that include radio capability can be implemented to benefit both manufacturers and the users.

FIG. 1 schematically illustrates an embodiment of a microcontroller 100.

Microcontroller 100 comprises, in the present example, seven distinct electronic functions and one interconnection circuit 116 (INTERCONNECT). More particularly, the functions here comprise two central processing units 102 (CPU1) and 104 (CPU2), two memories 106 (MEM1) and 108 (MEM2), one power supply circuit 110 (POWER), clocks 112 (TIMERS), one input/output interface 114 (PERIPH).

In practice, microcontroller 100 may comprise any number of electronic functions, provided to have at least one data processing unit and at least one memory.

Interconnection circuit 116 is capable of transmitting, in wireless fashion, data between different electronic functions of microcontroller 100. Data means any required signals, be they addresses, actual data, or control signals. Each electronic function of the microcontroller thus comprises a circuit capable of receiving and of transmitting data. Such transmit/receive circuits enable to establish a wireless connection between the different functions, via the interconnection circuit, and are for example compatible with one another.

Power supply circuit no is for example a wireless power supply circuit. The different electronic functions capable of forming part of the microcontroller are then capable of being powered by such a power supply circuit 110.

Memories 106 and 108 are, for example, volatile or non-volatile memories.

Input/output interface 114 is a circuit forming an interface between peripherals, not shown, and microcontroller 100. The peripherals are for example coupled to interface 114 by wire connections 118. Data can thus be transmitted between the peripherals and microcontroller 100 via a wire connection, between the peripherals and interface 114, and via a wireless connection, between interface 114 and the functions internal to microcontroller 100.

Figure 2:
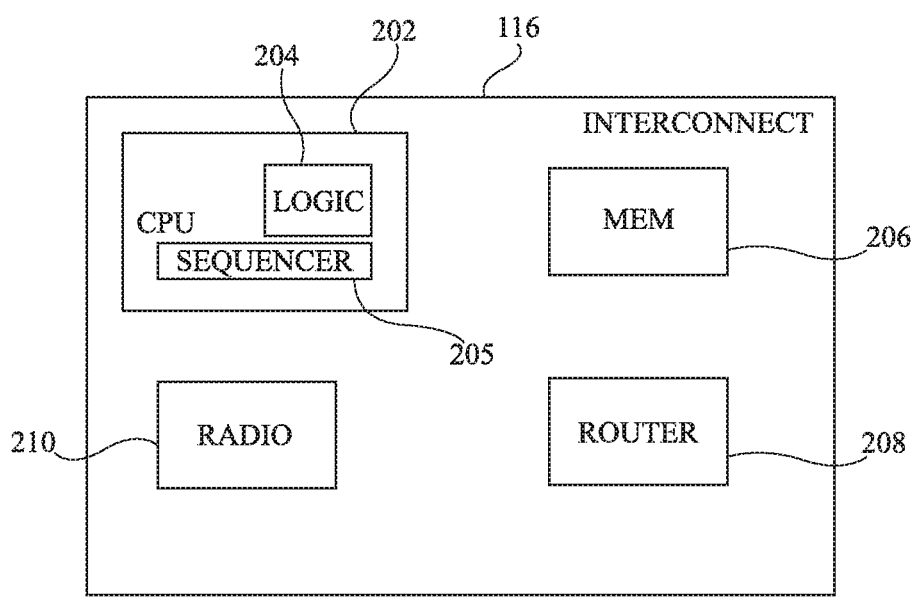
FIG. 2 illustrates electronic functional circuits used with an embodiment.

Each of the electronic functions can be a separately packed integrated circuit chip. With wireless power and communications, the chip does not need pins, which will save cost. In this case, each package would include a wireless power module and a radio module. An example of an interconnection circuit 116 of this microcontroller is shown in FIG. 2.

Electronic functions, capable of operating with interconnection circuit 116, may be added to or removed from the microcontroller at any time and in any number. To achieve this, the functions are placed within the range of interconnection circuit 116.

Circuit 116 is for example, a Wi-Fi router. Other possible examples of circuit 116 include the Internet (e.g. the cloud), a smartphone, a personal computer, a laptop computer, a tablet device, a smart television, as well as other devices capable of wireless communication (e.g. Wi-Fi, Bluetooth, 5G, 4G, NFC, etc.).

Figure 3:
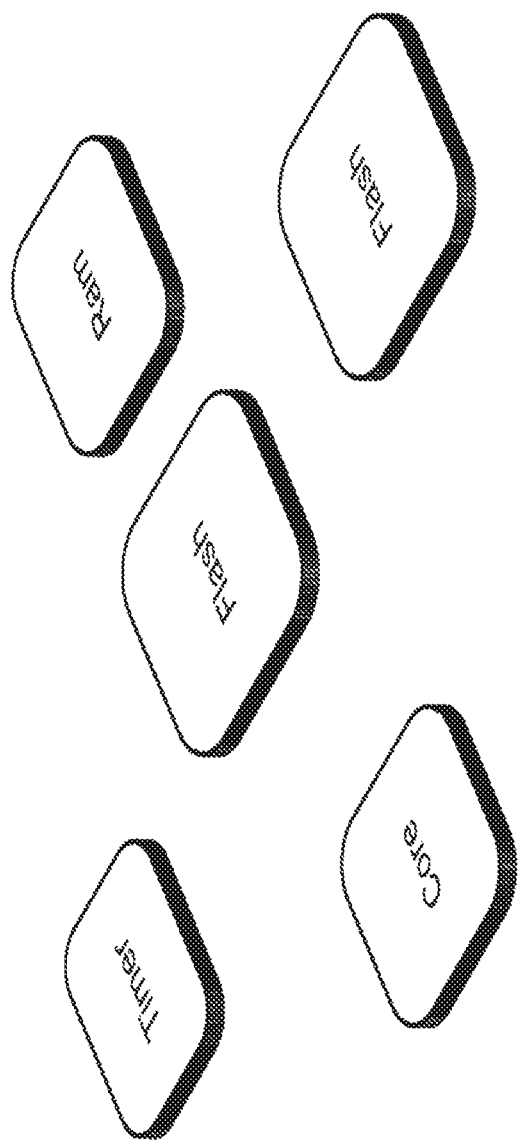
FIG. 3 illustrates in further detail a portion of the microcontroller of FIG. 1.

Another example of interconnection circuit 116 is described in relation with FIG. 3.

FIG. 3 illustrates in further detail a portion of the microcontroller of FIG. 1.

Circuit 116 (INTERCONNECT) comprises a central processing unit 202 (CPU) for example comprising logic circuits 204 (LOGIC) and a sequencer 205 (SEQUENCER), a memory 206 (MEM), a router 208 (ROUTER), and a radio frequency transmit/receive circuit 210 (RADIO).

Circuit 116 further comprises a power supply circuit, not shown, capable of being powered by wireless power supply circuit 110 (illustrated in FIG. 1).

Router 208 and transmit/receive circuit 210 enable data to be transmitted between the different functions of microcontroller 100.

In various embodiments, the sequencer 205 can be used to discover new components either to be added or to be removed from the system. The memory 206 can be used to store characteristics of the components in the system, e.g., characteristics of RAM, ROM, peripherals and others. The router 208 can comprise a circuit that receives requests from CPU to read/write to RAM or peripherals and for all exchanges needed from the program to run. The control logic 204 can be used to select which CPU runs which program found on the different memories and to start and stop program execution in case a part of system is not available.

The interconnect can be realized with a hardware (HW) ad hoc register-transfer level (RTL) or with a microcontroller based system to deal with most complex cases.

Figure 4:
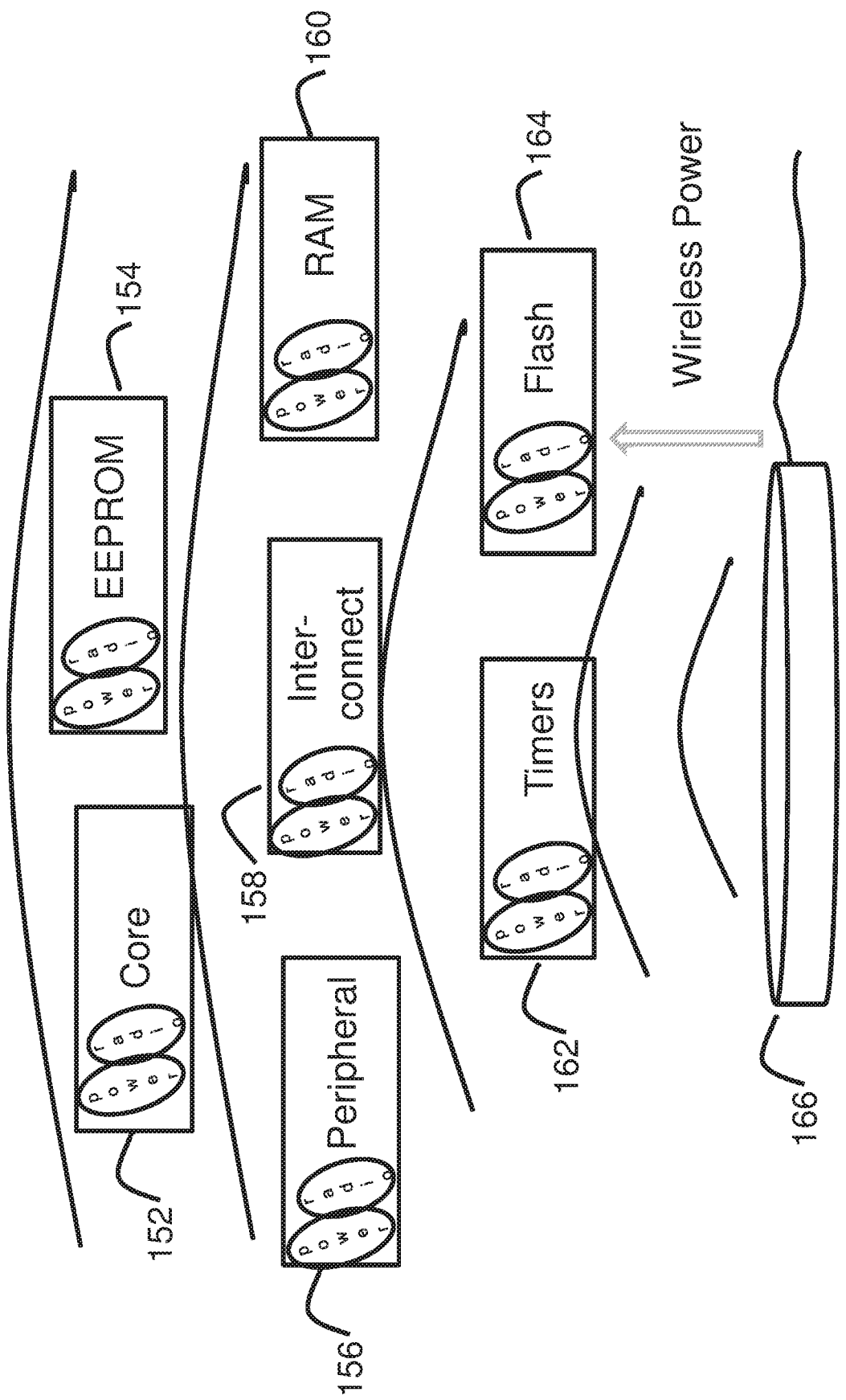
FIG. 4 schematically illustrates an embodiment of a microcontroller being powered.

FIG. 4 illustrates an example of the system being powered. Here a wireless power supply 166 is used to wirelessly power the functional circuits, which in the example include—core 153, EEPROM 154, a peripheral 156, an interconnect 158, RAM 160, timers 162 and flash 164.

Figure 5:
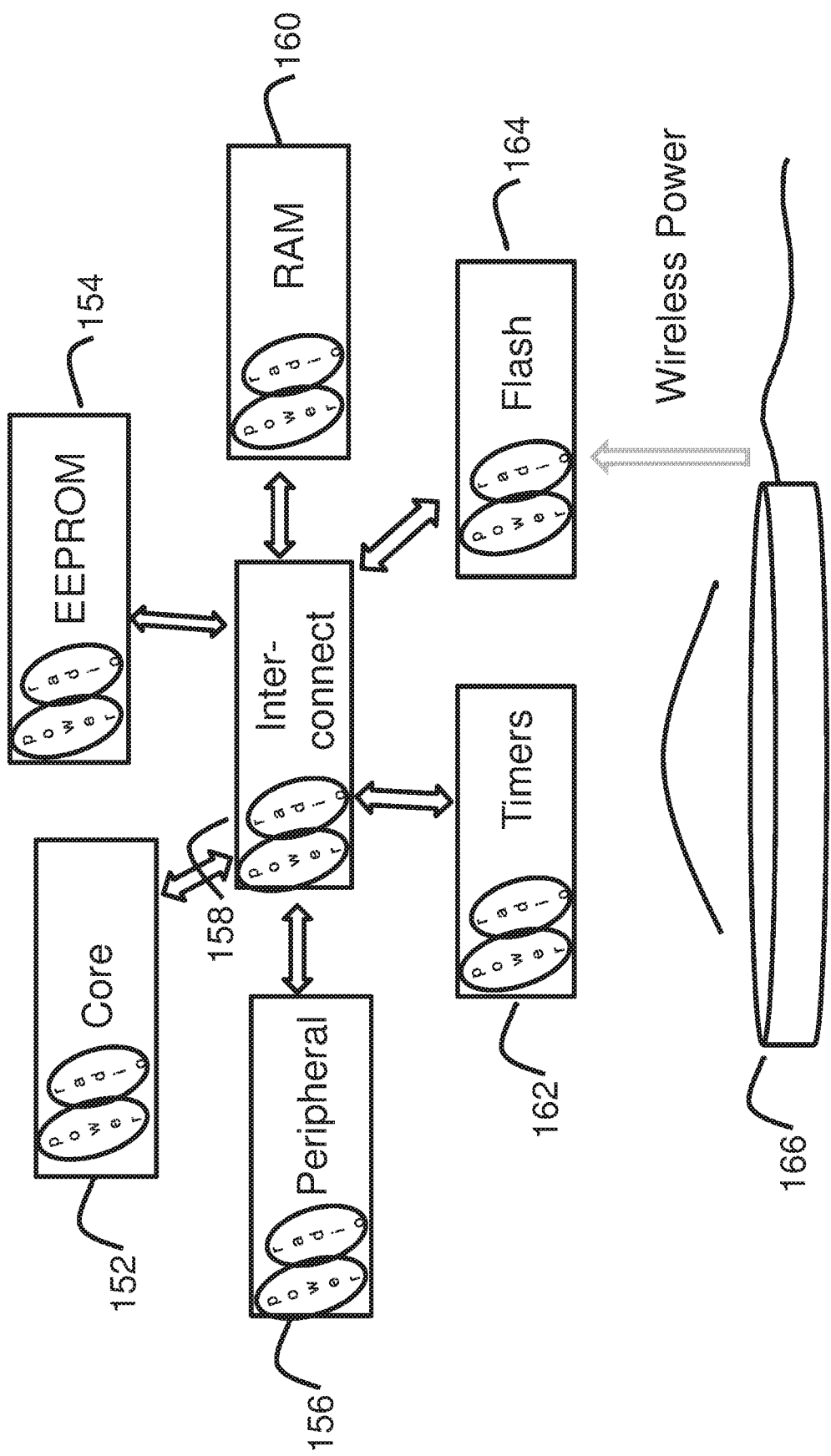
FIG. 5 schematically illustrates an embodiment of a microcontroller executing a program.

FIG. 5 illustrates the system of FIG. 4 during functional operation, e.g., when executing a program. As illustrated, the interconnect 158 can communicate with each of the other functions. While not necessary, the wireless charger can simultaneously provide power to the functions.

Figure 6:
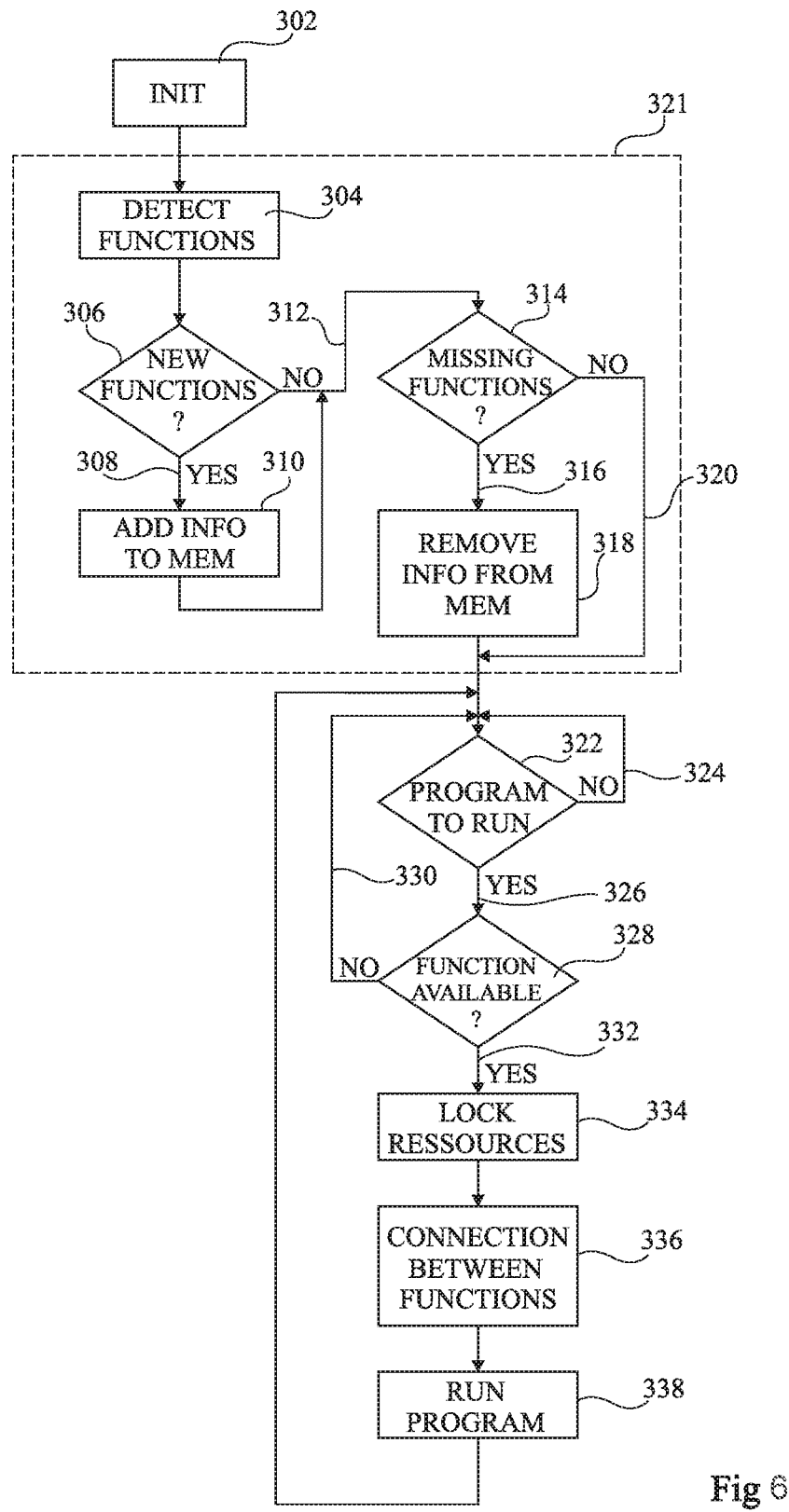
FIG. 6 illustrates a usage mode of the microcontroller of FIG. 1.

FIG. 6 illustrates a usage mode of the microcontroller of FIG. 1 comprising an interconnection circuit 116 such as described in relation with FIG. 3.

During a first step 302 (INIT), microcontroller 100 is initialized. The different electronic functions present are activated. In particular, power supply circuit no is set in operation, which enables it to power the other functions. Further, the electronic functions and interconnection circuit 116 are initialized to be ready to operate.

During a step 304 (DETECT FUNCTIONS) subsequent to step 302, interconnection circuit 116 detects the electronic functions present, that is, available for microcontroller 100. Circuit 116 for example detects the electronic functions located within the range of circuit 116.

Circuit 116 then determines, at a step 306 (NEW FUCNTIONS?), whether electronic functions that it had not previously detected, that is, functions having configuration characteristics which are not contained in memory 206, are present. If this is true (branch 308, YES), circuit 116 records, in memory 206, the configuration characteristics of each new function. This corresponds to a step 310 (ADD INFO TO MEM). Configuration characteristics means the characteristics for example enabling to transmit the data, to determine the functions between which data should be transmitted, and to determine whether the functions which are present are sufficient to execute a given program.

For example, in the case where the function is a memory, circuit 116 for example records the type of memory (ROM, RAM, Flash, etc.), the memory size, certain specific addresses, the memory speed, etc. In the case of a memory comprising programs, for example, a non-volatile memory, circuit 116 records the number of programs contained in the memory and the resources, that is, the types and number of electronic functions, used for the execution of the program.

After step 310, as well as in the case where circuit 116 does not detect electronic functions that it had not previously detected (branch 312, NO), circuit 116 determines whether certain functions having their configuration characteristics contained in memory 206 are absent or inaccessible (step 314, MISSING FUNCTIONS?). If such is the case, that is, if some of these functions are no longer present (branch 316, YES), circuit 116 erases the characteristics corresponding to these functions from memory 206 (step 318, REMOVE INFO FROM MEM).

After step 318, as well as in the case where circuit 116 determines that all the functions having their configuration characteristics contained in memory 206 are present and accessible (branch 320, NO), circuit 116 proceeds to the next step (step 322).

As a variation, steps 314 and 318 may be carried out before steps 306 and 310 or may be carried out simultaneously.

Steps 304 to 318 form a set of steps 321. Step 321 may be repeated during the operation of microcontroller 100. For example, step 321 is periodically repeated, for example, with a period in the range from approximately 1 ms to approximately 10 s, for example, in the range from approximately 7.5 ms to approximately 4 s. Step 321 is, for example, carried out before each step 322.

After, circuit 116 determines whether programs attempt to be executed (step 322, PROGRAM TO RUN?), for example on instruction of a central processing unit. Program means any activity of microcontroller 100 where data are transmitted between different functions of the microcontroller. Circuit 116 may for example enable to simultaneously execute a plurality of programs.

If no program is to be executed (branch 324, NO), interconnection circuit 116 is in waiting mode. If at least one program is to be executed (branch 326, YES), circuit 116 determines, for example, via logic circuits 204, whether the functions used by this program are present and available (step 328, FUNCTIONS AVAILABLE?). For example, if the program comprises writing or reading data into or from a memory, the functions used are for example a central processing unit and a memory.

If at least one of these functions is not present or is not available (branch 330, NO), circuit 116 proceeds to another program and returns to step 322. If all the functions used by the program are present and available (branch 332, YES), the functions are locked (step 334, LOCK RESOURCES), for example, by logic circuits 204, that is, they are no longer available for other programs which may attempt to use them. As a variation, certain functions may be capable of executing more than one program at a time. Such functions are then considered to be unavailable when they simultaneously execute the maximum number of programs.

Once this step has been carried out, a wireless connection is established, via the transmit/receive circuit 210 and router 208, between the functions used by the program (step 336, CONNECTION BETWEEN FUNCTIONS) and the program is started (step 338, RUN PROGRAM), via logic circuits 204. After the starting of the program, circuit 116 determines whether another program should be executed (step 322).

If a function is removed, for example, if it is no longer within the range of circuit 116 or is turned off, the programs using this function are either redirected to another similar function, or put to wait, or stopped. The configuration characteristics of the programs may for example comprise instructions for such a case.

Figure 7:
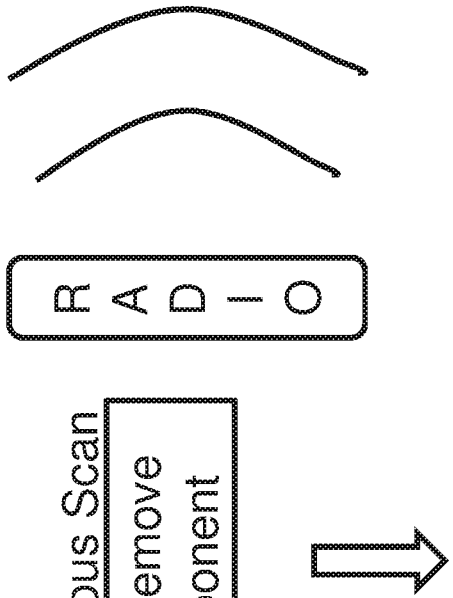
FIG. 7 provides another illustration of a usage mode.

FIG. 7 provides another representation of the operation of the system with reference to FIG. 3. After the boot, the interconnect starts to scan for components. When a component is found, characteristics of this component are added in the memory 206. For a RAM, for example, the system can store the amount of memory available, the speed, the number of bits and all the necessary information to operate the circuit. In case of ROM, the system could store the same information of the RAM but in addition the number of programs contained to be executed and which resources are needed for each program.

When the system includes at least one program contained in a ROM (or EPROM or equivalent), the control logic 204 will check if all the resources are available. These resources could include a CPU, a RAM and a peripheral, as examples. In the case where all the resources are available for example, the control logic will lock these resources and perhaps make them not available for other programs. In the case of a multitasking CPU, the resources can be shared between programs.

The control logic 204 will add some rules inside the router 208 in order to make a virtual connection between the selected resources. The control logic 204 will enable the selected CPU 202 to start the program. Requests from CPU 202 will pass through the router 208 and the router 208 will send the request to the external component, and vice versa in case of data from an external component this will be routed to the right CPU. The exchange will be the same as in the case of a wired interconnection.

If a component is removed from the system, the corresponding characteristics will be removed from the component memory list. The program or the programs associated with this resource will be put in standby or canceled. If the control logic can find an equivalent resource it can decide to restart the program. This behavior can be put in the characteristic of the program itself and, for example, it could be auto start or wait for a program to start it. In this manner, an auto start program can be like an operating system that reboots in case of error or failure. Other programs can be run by a user just like an app in a smartphone or an installed program in computer system.

An advantage of the described embodiments is that it is possible to form a microcontroller having a number of functions which is not limited by the available space and the number of wire connections. It is thus possible to add, if need be, functions, for example, memories, central processing units, etc.

Another advantage of the described embodiments is that the components may be physically remote from one another. Performance limits are given only by the bandwidth of the interconnect and the wireless power.

Another advantage of the described embodiments is that it is no longer necessary to provide wire connections internal to the microcontroller, which causes a decrease in the manufacturing cost. In an example embodiment, no pins are needed for the core, the EEPROM, the RAM, flash or interconnect. In various embodiments, physical electrical connections would be used only with peripheral chips such as USB, Ethernet, keyboard, graphic card and the like.

Some or all of the electronic functions of embodiment microcontrollers described herein may be integrated and/or included in an electronic device. For example, a user device (e.g. a smartphone, tablet device, smart watch, etc.) may supply various electronic functions of the microcontroller (e.g. CPU, clock(s), interconnection circuit, RAM, ROM, etc.) and still make use of externally located (distributed) electronic functions. The user device may then advantageously gain access to external software (programs, applications, routines, etc.), data, processing power, storage space, and capabilities by virtue of the distributed microcontroller architecture.

A specific example is a user desiring to run a new application on a smartphone. To run the application on the smartphone, the application must be downloaded and installed on the smartphone. The application cannot be run if the smartphone does not have space to store the program. Further, if the application requires resources (processing, memory, sensors, etc.) exceeding the capabilities of the smartphone, the application also cannot be run. Additionally, if the user does not have authority to install the application, then the application cannot be run. In other words, it is not possible to execute software that needs to be run without being installed for any reason.

One conventional solution to this problem is using a web based application where the code is not installed but is downloaded. An interpreter (e.g. Java) may then run it. However, the computer code to be run is still downloaded into the smartphone in this case which still requires additional time to download the code and space to store the code. Another conventional solution to this problem is a web based application where code is run on a server and only the result/image or video is shown to the client (smartphone). However, if there are many connections to the server and/or the physical distance between the smartphone and the server is large then quality is reduced.

The distributed microcontroller architectures described herein may be used to make an externally located ROM containing an application (as well as other electronic functions of a microcontroller) available to the smartphone. The smartphone can then advantageously run the application without downloading any code and without relying on a server to run the application. For example, the CPU(s), power, clock(s), RAM, and interconnection circuit functions of the microcontroller may be included in the smartphone while the ROM is external to the smartphone. Alternatively, some or all of the application may also be run using an external CPU(s).

In this way, the hardware (HW) capabilities of a user device (e.g. smartphone) may advantageously be extended. Another possible benefit is to lower the cost of running a complex application since specific functionality and/or capability can be externally located relative to the user device. With advanced wireless communication technologies, sufficient bandwidth and connection speed may exist to advantageously create a distributed microcontroller using hardware components that are not in the immediate vicinity of the user device.

Figure 8:
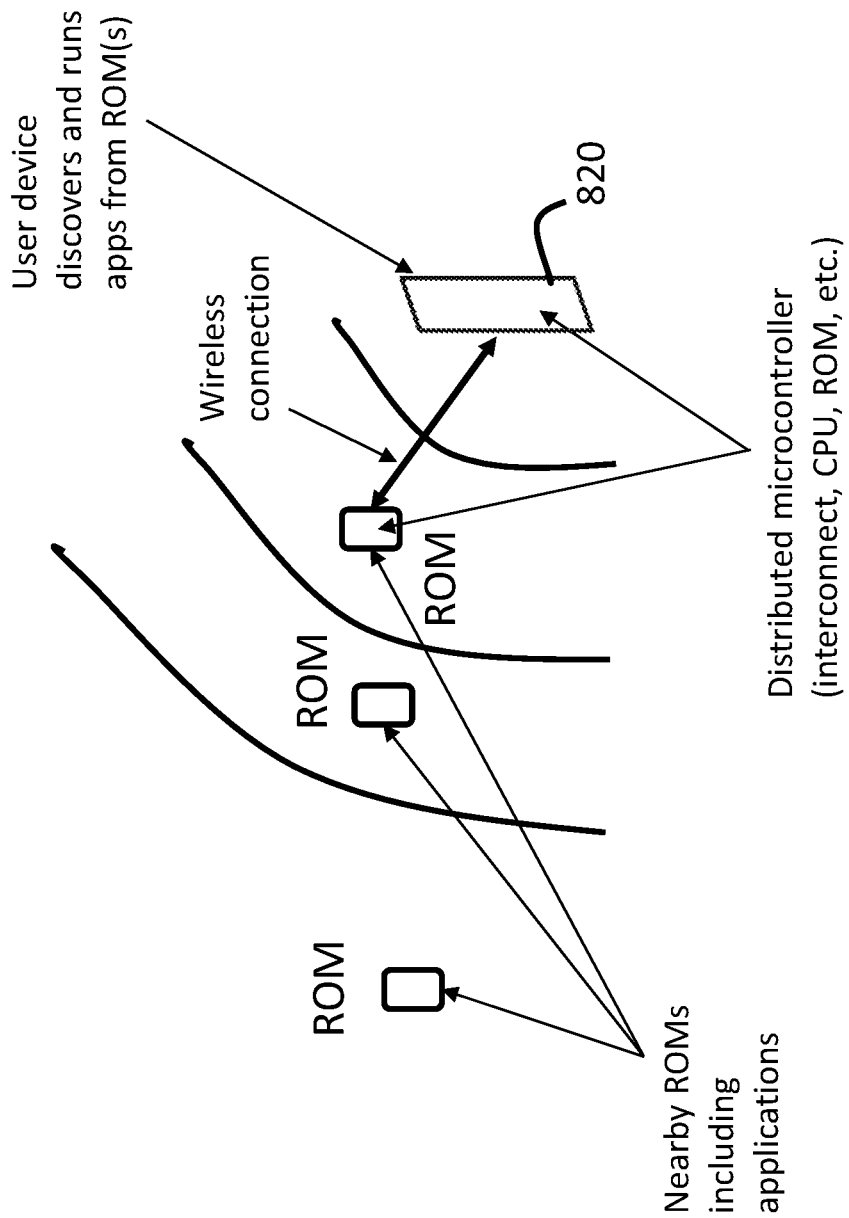
FIG. 8 schematically illustrates an example usage mode of an embodiment microcontroller including in a mobile electronic device.

FIG. 8 schematically illustrates an example usage mode of an embodiment microcontroller including in a mobile electronic device.

Referring to FIG. 8, a mobile electronic device 820 is schematically illustrated. The mobile electronic device 820 includes at least an interconnection circuit of a distributed microcontroller, both of which may be as previously described. The mobile electronic device 820 may be any suitable mobile device such as a smartphone, smartwatch, tablet device, laptop device, etc.

In addition to the interconnection circuit, the mobile electronic device 820 may also include additional functional circuits implemented as electronic circuits which may or may not be separately packaged. For example, the mobile electronic device 820 may include one or more central processing units (CPUs), random-access memories (RAMs), read-only memories (ROMs), clocks, input/output interfaces, power supply circuits, and others. In one embodiment, the mobile electronic device 820 includes a CPU and an interconnection circuit implemented as part of a distributed microcontroller.

In the example usage mode of FIG. 8, the mobile electronic device 820 is physically located in wireless range of at least one nearby ROM. The nearby ROM is externally located relative to the mobile electronic device 820 (e.g. the ROM may be disposed in a nearby electronic device outside the mobile electronic device 820 within wireless range of the interconnection circuit). The nearby ROM may include external software (e.g. application, program, etc.). In one embodiment, the ROM stores a computer program and the CPU is configured to execute the computer program. For example the CPU may execute a program from the nearby ROM as if the ROM were directly connected to the CPU (e.g. without installing it and/or without downloading the program prior to execution).

The interconnection circuit communicates with the nearby ROM using a wireless connection as shown. The wireless connection may be any suitable type of wireless connection. In one embodiment, the wireless connection is a Wi-Fi connection. In another embodiment, the wireless connection is a Bluetooth connection. In still another embodiment, the wireless connection is a 5G connection. The wireless connection may also be proprietary (e.g. use custom radios) in some embodiments.

The interconnection circuit may actively scan to locate, update, use, and cease using available resources (i.e. functional circuits) such as the nearby ROM. The interconnection circuit may also be limited to scanning for particular functional circuits (such as a ROM) or may scan for all functional circuits (including ROMs). This functionality may be static or may be dynamic and may be controlled by a user or device carrier in some cases.

In some embodiments, additional functional circuits such as RAM, CPUs, sensors, and peripherals may be externally provided near or with the nearby ROM. For example, a particular ROM may require considerable computing resources or specific peripherals not found in every mobile electronic device. In this case additional CPUs, RAM, and/or peripherals may be included with the nearby ROM to expand the hardware capabilities of the mobile electronic device. In such cases, the mobile electronic device is by no means limited only to execute a program from the nearby ROM with external CPUs. Rather, external and internal CPUs can simultaneously be used or the mobile electronic device may execute the program with an internal CPU for a variety of reasons (user preference, computational efficiency, etc.).

The combination of the CPU and interconnection circuit in the mobile electronic device 820 with the externally located ROM forms a distributed microcontroller, the details of which are described elsewhere herein. Additional ROMs as well as additional functional circuits may also be included in the distributed microcontroller and may be added and subtracted as the mobile electronic device 820 is moved changing the boundaries of the wireless range of the interconnection circuit.

In one example, the mobile electronic device 820 comprises functional circuits of a fully distributed microcontroller. That is, the interconnection circuit only communicates with the CPU (and any other functional circuits of the distributed microcontroller) using a wireless connection.

In another example, the mobile electronic device 820 comprises functional circuits of a partially distributed microcontroller. Specifically, the CPU (and any other functional circuits of the distributed microcontroller internally located within the mobile electron device 820) communicates with the interconnection circuit using a wired connection. In this case, the interconnection circuit still maintains the wireless communication capability so that externally located functional circuits such as the nearby ROM may be included in the distributed microcontroller.

Of course, the communication scheme within the mobile electronic device 820 is not limited to fully wireless or fully wired communication. Some components (e.g. functional circuits) in the mobile electronic device may be wired to each other (including wired to the interconnection circuit) while others may communicate wirelessly with the interconnection circuit. For example, circuits such as the CPU, RAM, input/output interface, and clock may be wired to the interconnection circuit using a printed circuit board, while additional (and possibly optional) functional circuits are included inside the mobile electronic device 820, but only communicate wirelessly with the interconnection circuit.

As previously described above (such as in reference to FIG. 2, for example) the interconnection circuit may itself include a processing circuit, a router, a memory circuit, and a data transmit/receive circuit and be implemented as a single packaged semiconductor chip.

Figure 9:
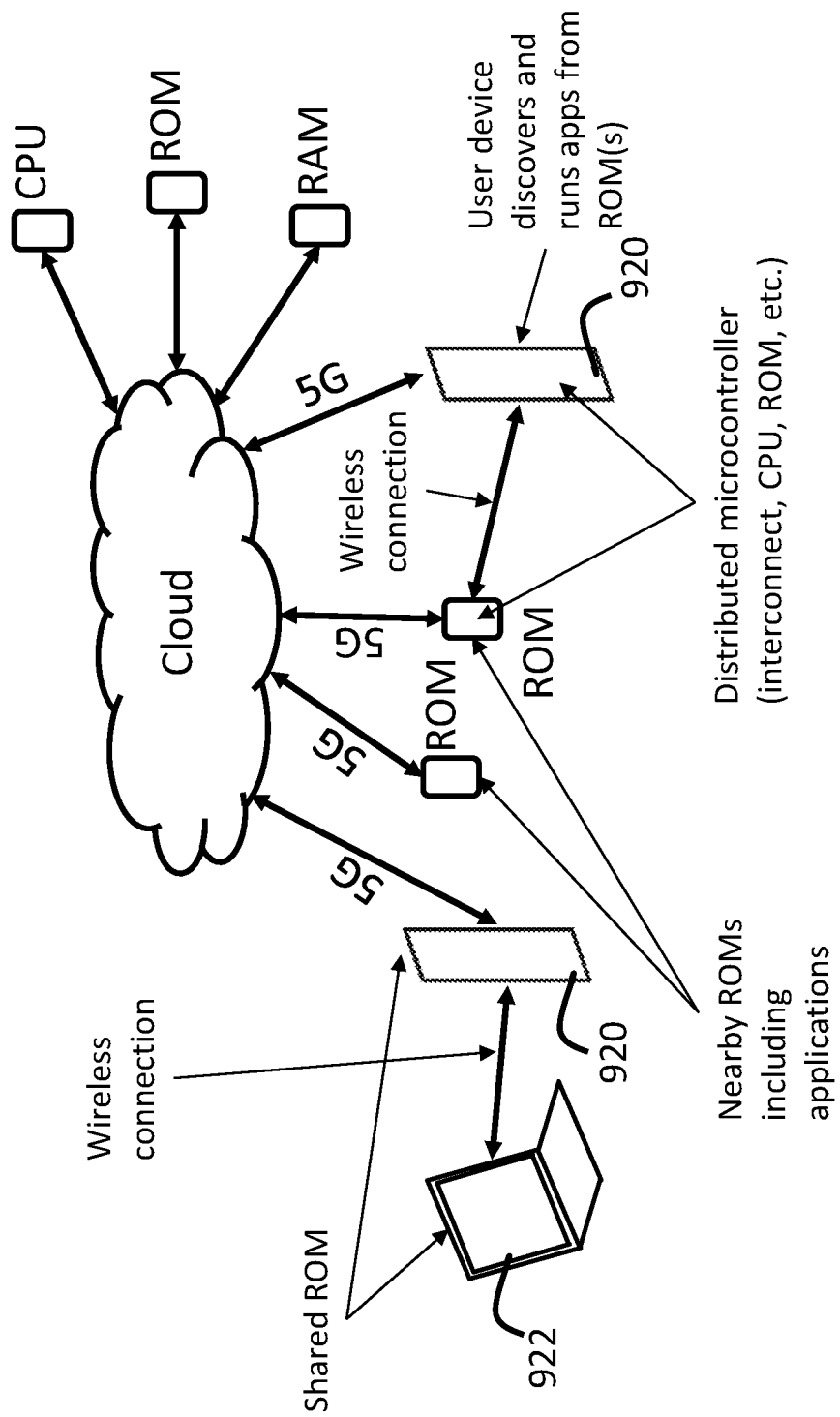
FIG. 9 schematically illustrates another example usage mode of an embodiment microcontroller including a mobile electronic device.

FIG. 9 schematically illustrates another example usage mode of an embodiment microcontroller including a mobile electronic device.

Referring to FIG. 9, a mobile electronic device 920 is schematically illustrated. The mobile electronic device 920 may be similar to or a specific implementation of other mobile electronic devices described herein such as the mobile electronic device 820 of FIG. 8, for example.

The example usage mode schematically illustrated in FIG. 9, may be similar to that of FIG. 8, except the added functionality of wireless communication with the cloud (e.g. using 5G) is also shown. For example, in addition to creating a distributed microcontroller physically confined to the wireless range of the interconnection circuit in the mobile electronic device 920, a more expansive distributed microcontroller may be created using the internet.

High throughput and low latency wireless connections (e.g. 5G) may advantageously extend the capabilities of the distributed microcontroller to include cloud functionality. The cloud functionality may beneficially extend the hardware capabilities of the mobile electronic device 920. In this way, a distributed microcontroller can advantageously be created with another device (e.g. 5G capable device) locally and/or in the cloud.

In a specific example, the functionality and computational capabilities of a 5G enabled smartphone (mobile electronic device) may be advantageously increased. The smartphone may only have one CPU and rent/pay/borrow additional CPUs, memories, and other hardware and software from the Internet. Functional circuits such as CPUs, RAMs, ROMs and more may be shared at the same way as a web page. The smartphone may act as a client of one or more servers connected to the Internet which have distributed protocol access to emulate CPU/RAM/ROM/etc.

As shown in FIG. 9, the mobile electronic device 920 may have the local functionality of the distributed microcontroller as well as the cloud functionality. For example, the CPU disposed inside the mobile electronic device 920 may execute a computer program located in an externally located ROM disposed in a nearby electronic device within wireless 5G range of the interconnection circuit of the mobile electronic device 920. In this case, the wireless connection may be made using 5G, but not pass through the cloud.

However, the mobile electronic device 920 may also use cloud resources to execute all of portions of a computer program located in a ROM in a physical nearby located or located in the cloud. In this case some communication between the interconnection circuit in the mobile electronic device 920 and the cloud resources (e.g. CPU, ROM, RAM, etc.) would be through the Internet.

FIG. 10 provides an illustration of an application of the example usage modes of FIGS. 8 and 9.

Referring to FIG. 10, a mobile electronic device 1020 is schematically illustrated in a place of interest 1000. The mobile electronic device 1020 may be similar to or a specific implementation of other mobile electronic devices described herein such as the mobile electronic device 820 or the mobile electronic device 920 of FIGS. 8 and 9 respectively.

The place of interest 1000 may be in a location that may benefit from computer programs relating to being in a specific geographical location. For example, the place of interest 1000 may be a park (e.g. theme park such as Disneyland, national park, city park), a museum, an art gallery, a sports arena, a theater, a historical marker, and others. The place of interest 1000 may have specific ROMs in particular locations with the ROMs storing computer programs related to the particular locations.

In the specific case of an art museum, ROMs relating to exhibits (e.g. paintings as illustrated) may be interspersed throughout various rooms in the museum. Art museum patrons that are inside a given room may discover an application (computer program) stored on a nearby ROM using an interconnection circuit inside a mobile electronic device 1020 (smartphone). The application may advantageously belong only to the art museum. Additionally, the application may only exist in that place and not on the Internet.

Potential visitors to the art museum may be inspired to travel to the art museum to gain the benefit of the application. In this way a unique experience may be provided to users through distributed microcontrollers using interconnection circuits inside a mobile electronic device. The unique experience may be restricted to the unique place and without hosting software in the cloud or accessing the Internet.

In addition to places of interest 1000, this application is extendable to vehicles as well. For example, computer programs and/or hardware functionality may be made locally accessible in a similar manner in planes, trains, cars, buses, boats, and any other type of vehicle. Such an application may provide various advantages such as enhanced security, improved user experience, and access to unique locally relevant content that may change depending on the location of the vehicle.

For example, this application may deliver a unique application (e.g. computer program) to users with mobile electronic devices located in both places of interest and vehicles that advantageously provides location-specific branding and/or information without the need to install the application or have an internet connection.

As a specific example of a method that may be used in the above application, an external computer program may be executed by writing configuration characteristics into a memory of an interconnection circuit for a distributed microcontroller, determining the presence of an additional electronic functional circuit within wireless range of the interconnection circuit, updating the configuration characteristics in the memory of the interconnection circuit to include configuration information for the additional electronic functional circuit, and executing the computer program using a CPU.

For example, the distributed microcontroller initially includes a plurality of electronic functional circuits. In order for the distributed microcontroller to function using the plurality of electronic functional circuits, configuration characteristics of the plurality of electronic functional circuits are written into the memory of the interconnection circuit. The plurality of electronic functional circuits includes the CPU. The CPU and/or the interconnection circuit may be included in a mobile electronic device (e.g. smartphone).

The additional electronic functional circuit is configured to wirelessly communicate with the interconnection circuit. In one embodiment, the additional electronic functional circuit is configured to wirelessly communicate with the interconnection circuit using 5G. The interconnection circuit may determine the presence of the additional electronic functional circuit by detecting a wireless signal broadcast by the additional electronic functional circuit.

The additional electronic functional circuit includes a ROM storing the computer program. The program is executed by the CPU by wirelessly transmitting data of the computer program between the CPU and the ROM through the interconnection circuit. As a result, the computer program is advantageously executed without downloading or installing the computer program. For example, the computer program may be executed directly from the ROM.

Additionally, the distributed microcontroller may determine the absence of the additional electronic functional circuit within the wireless range of the interconnection circuit. In response to the absence of the additional electronic functional circuit, the distributed microcontroller may redirect, suspend, or stop execution of the computer program and update the configuration characteristics in the memory of the interconnection circuit. The update may be performed by erasing the configuration information for the additional electronic functional circuit.

As mentioned above, the ROM may be statically located at a place of interest and the computer program may include location-specific information about the place of interest. The CPU may be disposed in a mobile electronic device (e.g. carried by a user in the place of interest). Alternatively, the ROM may be statically located within a vehicle while the CPU is disposed in a mobile electronic device.

Various embodiments with different variations have been described hereinabove. Other variations will occur to those skilled in the art. It should be noted that those skilled in the art may combine various elements of these various embodiments and variations.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A microcontroller comprising:
    a processor;
    a circuit in communication with the processor, wherein each of the processor and the circuit is physically located in an electronic device;
    a memory storage comprising a program directly executable by the processor, the memory storage in communication with the processor, wherein the memory storage is physically located outside the electronic device; and
    an interconnection circuit physically located in the electronic device, the interconnection circuit configured to provide communication between the processor, the memory storage, and the circuit, wherein the communication between the processor and the memory storage is a wireless communication.

2. The microcontroller of claim 1, wherein the processor communicates with the interconnection circuit using a wireless connection.

3. The microcontroller of claim 1, wherein the processor communicates with the interconnection circuit using a wired connection.

4. The microcontroller of claim 1, wherein the memory storage is physically located in a second electronic device, wherein the second electronic device is within a wireless range of the interconnection circuit.

5. The microcontroller of claim 1, wherein the interconnection circuit is configured to wirelessly communicate with the memory storage using a Wi-Fi communication.

6. The microcontroller of claim 1, wherein the interconnection circuit is configured to wirelessly communicate with the memory storage using a Bluetooth communication.

7. The microcontroller of claim 1, wherein the interconnection circuit is configured to wirelessly communicate with the memory storage using a fifth generation (5G) wireless network.

8. The microcontroller of claim 1, wherein the electronic device is one of a smartphone, a personal computer, a laptop computer, a tablet device, or a smart television.

9. The microcontroller of claim 1, wherein the program directly executable by the processor is executed without downloading and installing the program.

10. An electronic device comprising:
    an interconnection circuit configured to wirelessly communicate with a memory storage using a fifth generation (5G) wireless network, the memory storage physically located externally to the electronic device, and the memory storage comprising a program; and
    a processor coupled to the interconnection circuit and configured to directly execute the program without downloading or installing the program.

11. The electronic device of claim 10, wherein the interconnection circuit wirelessly communicates with the memory storage using an internet connection.

12. The mobile electronic device of claim 10, wherein the memory storage is physically located in a second electronic device, wherein the second electronic device is within a wireless 5G range of the interconnection circuit.

13. The electronic device of claim 10, wherein the interconnection circuit is configured to wirelessly communicate with a second processor, wherein the second processor is an externally located processor, wherein the second processor is configured to execute portions of the program.

14. The electronic device of claim 10, wherein the interconnection circuit comprises a processing circuit, a router, a memory circuit, and a data transmit/receive circuit implemented as a single packaged semiconductor chip.

15. A method comprising:
writing configuration characteristics into a first memory storage of an interconnection circuit for a distributed microcontroller, the distributed microcontroller comprising a first circuit, the first circuit comprising a processor;
determining a presence of a second circuit within a wireless range of the interconnection circuit, the second circuit configured to wirelessly communicate with the interconnection circuit, and the second circuit comprising a second memory storage comprising a program directly executable by the processor;
updating the configuration characteristics in the first memory storage to include configuration information for the second circuit; and
executing, by the processor, the program by wirelessly transmitting data of the program between the processor and the second memory storage through the interconnection circuit, the program being directly executed without downloading and installing the program.

16. The method of claim 15, further comprising:
determining an absence of the second circuit within a wireless range of the interconnection circuit;
redirecting, suspending, or stopping execution of the program; and
updating the configuration characteristics in the first memory storage by erasing the configuration information associated with the second circuit.

17. The method of claim 15, wherein the second circuit is configured to wirelessly communicate with the interconnection circuit using a fifth generation (5G) wireless network.

18. The method of claim 15, wherein directly executing the program comprises executing the program directly from the second memory storage.

19. The method of claim 15, wherein the second memory storage is statically located within a vehicle, and wherein the processor is physically located in an electronic device.

20. The method of claim 15, wherein the second memory storage is statically located at a place of interest, wherein the program comprises location-specific information about the place of interest, and wherein the processor is physically located in an electronic device.

* * * * *

UNITED STATES PATENT AND TRADEMARK OFFICE
CERTIFICATE OF CORRECTION

PATENT NO. : 11,038,554 B2  
APPLICATION NO. : 16/844816  
DATED : June 15, 2021  
INVENTOR(S) : Giovanni Scozzola It is certified that error appears in the above-identified patent and that said Letters Patent is hereby corrected as shown below:

In the Claims

In Claim 12, Column 12; Line 57 delete "mobile"

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*